(12) United States Patent
Sim et al.

(10) Patent No.: US 8,301,173 B2
(45) Date of Patent: Oct. 30, 2012

(54) APPARATUS FOR WIRELESS CONNECTION TO A MOBILE PHONE AND POSSIBLE APPLICATIONS OF THE APPARATUS

(75) Inventors: Wong Hoo Sim, Singapore (SG); Yam Fei Lian, Singapore (SG)

(73) Assignee: Creative Technology Ltd, Singapore (SG)

( * ) Notice: Subject to any disclaimer, the term of this patent is extended or adjusted under 35 U.S.C. 154(b) by 421 days.

(21) Appl. No.: 12/676,885

(22) PCT Filed: Sep. 5, 2008

(86) PCT No.: PCT/SG2008/000333
§ 371 (c)(1),
(2), (4) Date: Mar. 5, 2010

(87) PCT Pub. No.: WO2009/031980
PCT Pub. Date: Mar. 12, 2009

(65) Prior Publication Data
US 2010/0234049 A1  Sep. 16, 2010

(30) Foreign Application Priority Data
Sep. 5, 2007  (SG) .............................. 200706522-0

(51) Int. Cl.
*H04W 24/00* (2009.01)
(52) U.S. Cl. ................................. 455/456.6; 455/456.1
(58) Field of Classification Search ............... 455/456.1, 455/456.2, 456.3, 456.4, 456.5, 456.6, 41.2; 342/443, 464
See application file for complete search history.

(56) References Cited

U.S. PATENT DOCUMENTS
5,880,732 A   3/1999   Tryding
(Continued)

FOREIGN PATENT DOCUMENTS
WO   2005/025194 A1   3/2005
(Continued)

OTHER PUBLICATIONS

Gustafson M. and Magnusson P., "Wireless Application Development in a Telematics Environment", Mar. 19, 2003.

*Primary Examiner* — Phuoc Doan
(74) *Attorney, Agent, or Firm* — Creative Technology Ltd

(57) ABSTRACT

There is provided an apparatus that is connectable wirelessly with a mobile phone. The apparatus includes a casing for encasing components of the apparatus. A display unit is mounted within the casing for the display of content to a user. There is a processor coupled with the display unit to control the content displayed in the display unit. There is also a transceiver coupled to the processor within the casing to enable the wireless connection between the apparatus and the mobile phone. A memory module is coupled to the processor, the memory module being for storage of data and applications. There may be a positioning module coupled to the processor, the positioning module being for provision of a location of the apparatus to the mobile phone. It is preferable that a set of controls is coupled to the processor for controlling the apparatus, and the set of controls may be controllable by the user either via touch or voice. It is advantageous that the apparatus is used for applications selected from the group consisting of: making and receiving telephone calls using a wide area connection of the mobile phone, composing and receiving messages using the wide area connection of the mobile phone, accessing the internet using the wide area connection of the mobile phone, and playing back media content on the apparatus.

17 Claims, 3 Drawing Sheets

U.S. PATENT DOCUMENTS

| | | |
|---|---|---|
| 6,788,200 B1 | 9/2004 | Jamel et al. |
| 6,850,784 B2 | 2/2005 | Sangiovanni |
| 7,035,650 B1 * | 4/2006 | Moskowitz et al. ....... 455/456.5 |
| 7,130,643 B2 * | 10/2006 | Bates et al. ................ 455/456.1 |
| 2006/0099995 A1 | 5/2006 | Kim et al. |
| 2006/0105808 A1 | 5/2006 | Warren |
| 2007/0032225 A1 | 2/2007 | Konicek et al. |

FOREIGN PATENT DOCUMENTS

| | | |
|---|---|---|
| WO | 2006/108071 A2 | 10/2006 |
| WO | 2007/061157 A1 | 5/2007 |

* cited by examiner

APPARATUS FOR WIRELESS CONNECTION TO A MOBILE PHONE AND POSSIBLE APPLICATIONS OF THE APPARATUS

FIELD OF INVENTION

This invention relates to an apparatus which is connectable wirelessly with a mobile phone and some applications of the apparatus.

BACKGROUND

Technological advances have led to several different devices being combined into a single integrated device. It is generally believed that a mobile phone is a must-have device for any individual in this day and age. As such, it is this belief which drives the proliferation of all-in-one mobile phones which are integrated with additional non-phone centric features such as, for example, a digital camera, a media player, a GPS location directional unit, Wi-Fi connectivity, and the like.

However, it is common for such multi-purpose mobile phones to be used primarily for phone calls and SMS-ing (texting). The other features available to the user are generally overlooked regularly because of reasons such as, for example, the phone is too heavy/bulky/fragile to use during physical exercise, the screen of the phone is inadequate either size wise or quality wise, the phone is too slow to perform tasks efficiently and so forth. Thus, it would be preferable that a mobile phone enables a degree of flexibility to allow the use of the many functionalities incorporated within the mobile phone, but with little penalty to the user in relation to accessibility and usability of the various functionalities.

In addition, security considerations has led to prohibitions relating to the use of multi-purpose mobile phones in secured areas. It is unfortunate that these multi-purpose mobile phones cannot be allowed into the secured areas, and this adversely affects contactability of the users of the multi-purpose mobile phones. This has led to users of the multi-purpose mobile phone questioning a practicality of owning the multi-purpose mobile phones.

Maximising the use of the various functionalities of the mobile phones would allow for the user to fully appreciate the benefits and convenience from the ownership of such multi-purpose mobile phones.

Reference in the specification is made to U.S. Pat. No. 6,928,433 titled "Automatic Hierarchical Categorization of Music By Metadata" which is assigned to Creative Technology Ltd. The reference is made in relation to a media file management application that will be mentioned in the section titled "Description of the Preferred Embodiments".

SUMMARY

There is provided an apparatus that is connectable wirelessly with a mobile phone. The apparatus includes a casing for encasing components of the apparatus. A display unit is mounted within the casing for the display of content to a user. There is a processor coupled with the display unit to control the content displayed in the display unit. There is also a transceiver coupled to the processor within the casing to enable the wireless connection between the apparatus and the mobile phone. A memory module is coupled to the processor, the memory module being for storage of data and applications. There may be a positioning module coupled to the processor, the positioning module being for provision of a location of the apparatus to the mobile phone. It is preferable that a set of controls is coupled to the processor, for controlling the apparatus, and the set of controls may be controllable by the user either via touch or voice. It is advantageous that the apparatus is used for applications selected from the group consisting of: making and receiving telephone calls using a wide area connection of the mobile phone, composing and receiving messages using the wide area connection of the mobile phone, downloading data using the wide area connection of the mobile phone, accessing the internet using the wide area connection of the mobile phone, and playing back media content on the apparatus. The media content may be stored in the mobile phone.

The casing may be received in a receptor of the mobile phone. The transceiver may employ wireless technologies such as, for example, UWB, Bluetooth, infrared, and any form of radio frequency transmission. It is advantageous that the positioning module provides the location of the apparatus using either GPS or Wi-Fi positioning. The wide area connection of the mobile phone may be via, for example, GPRS, EDGE, 3.5G, HSUPA, HSDPA, GSM, WAP, Wi-Fi, WiMax, LTE and so forth. The apparatus may be able to provide an indication of the location to the mobile phone when the apparatus is in a pre-defined area, the indication being an aural signal, a visual signal or a combination of both. The pre-defined area is denoted by either a set of GPS coordinates or a set of Wi-Fi hotspot locations.

It is advantageous that a contact list of the mobile phone is accessible by the user using the apparatus. Advantageously, the set of controls enable user interaction with a user interface and applications running on the mobile phone.

The media content may be played back on the apparatus using a media player application running on the mobile phone.

In a second aspect, there is provided a method for accessing the internet, downloading data, making/receiving telephone calls and sending/receiving SMS-es via a wide area connection of the mobile phone using a secondary apparatus that is wirelessly connectable to a mobile phone. The method may include making a wide area network connection to the mobile phone and wirelessly connecting the secondary apparatus to the mobile phone. The secondary apparatus may then be able to access the internet, download data, make/receive telephone calls and send/receive messages using the network connection of the mobile phone. The wide area network connection to the mobile phone may include connections using, for example, GPRS, EDGE, 3.5G, HSUPA, HSDPA, GSM, WAP, Wi-Fi, WiMax, LTE and the like.

It is preferable that the wireless connection of the secondary apparatus to the mobile phone uses wireless technologies such as, for example, UWB, Bluetooth, infrared, any form of radio frequency transmission and so forth. The secondary apparatus may include a set of controls using either via touch or voice for controlling the secondary apparatus. The set of controls may advantageously enable user interaction with a user interface and applications running on the mobile phone.

In a third aspect, there is provided a method for providing a location of a secondary apparatus that is wirelessly connectable to a mobile phone to a user of the mobile phone. The method may include wirelessly connecting the secondary apparatus to the mobile phone; and transmitting the location of the secondary apparatus to the mobile phone using information obtained from a positioning module incorporated in the secondary apparatus when the secondary apparatus enters a pre-defined area. It is advantageous that the positioning module provides the location of the secondary apparatus using either GPS or Wi-Fi positioning. It is preferable that the wireless connection of the secondary apparatus to the mobile phone uses wireless technologies such as, for example, UWB, Bluetooth, infrared, any form of radio frequency transmission and the like. The pre-defined area may be denoted by either a set of GPS coordinates or a set of Wi-Fi hotspot locations.

In a final aspect, there is provided a method for playing back media content stored on a mobile phone on a secondary apparatus. The method may include wirelessly connecting the secondary apparatus to the mobile phone, a user of the secondary apparatus using a set of controls on the secondary apparatus requesting for media content stored on the mobile phone to be played back on the secondary apparatus, and playing back the media content on the secondary apparatus using a media player running on the mobile phone. Preferably, the wireless connection of the secondary apparatus to the mobile phone uses wireless technologies such as, for example, UWB, Bluetooth, infrared, any form of radio frequency transmission and the like. It is advantageous that the set of controls enable user interaction with a user interface and applications running on the mobile phone. The set of controls may be controllable by the user either via touch or voice.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
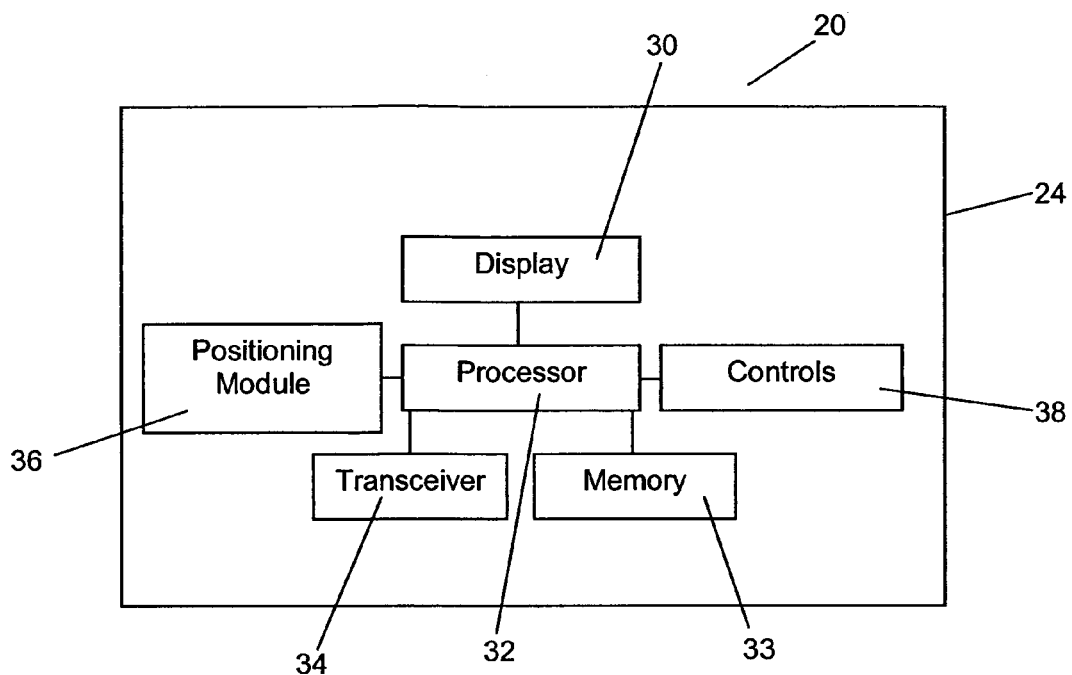
FIG. 1 shows a schematic diagram of a preferred embodiment of the apparatus.
Figures 2A, 2B:
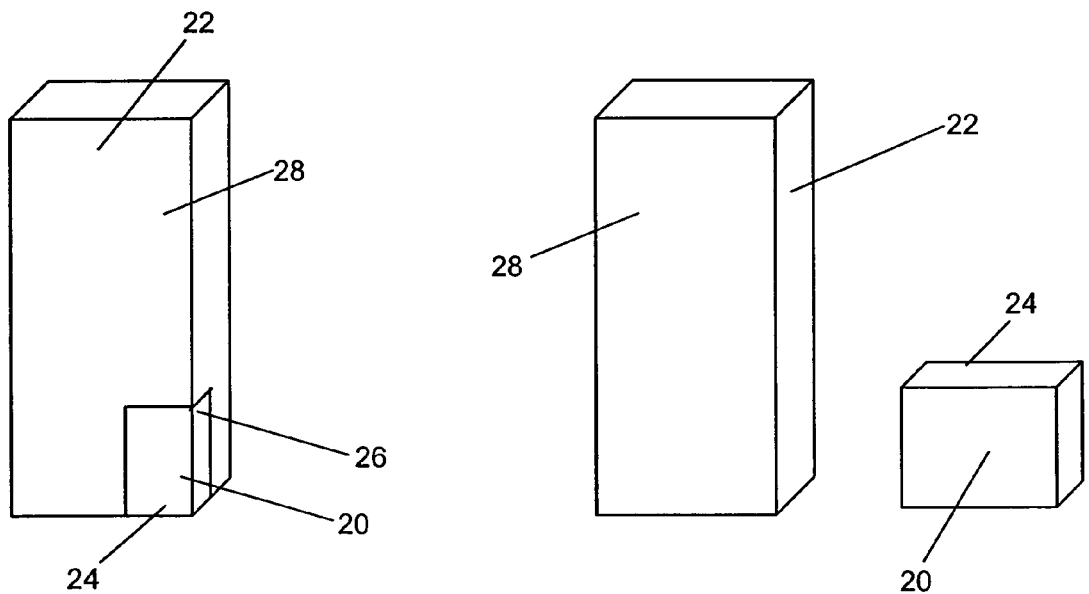
FIG. 2 shows a perspective view of the preferred embodiment of the apparatus located in a receptor of a mobile phone, the mobile phone being depicted in a rear view.

In a first aspect, with reference to FIGS. 1 and 2, there is provided an apparatus 20 that is connectable wirelessly with a mobile phone 22. The apparatus 20 includes a casing 24 for encasing all components of the apparatus 20. The casing 24 may be made from either a metal or a polymer. The material used for the casing 24 may depend on where the apparatus 20 is received in a receptor 26 of the mobile phone 22. While the receptor 26 is depicted in FIG. 2A as being located at an edge of the mobile phone 22, it should be noted that such a representation is not limiting, and the receptor 26 may be located at other portions of the mobile phone 22, and may even be in the form of a slot. The mobile phone 22 with a candy-bar form factor shown in FIG. 2 may also be in a clam-shell or any other form factor. The apparatus 20 may be a standalone device and not designed to dock with any mobile phone 22 as shown in FIG. 2B. The apparatus 20 may be able to adhere to the mobile phone 22 using either adhesives or magnetic attraction.

In the instance where the apparatus 20 is designed for a particular mobile phone 22 model, the casing 24 may be made of a material which has a similar feel/finish to a surface 28 of the mobile phone 22. Generally, the casing 24 may be made of a material which has a surface with a high coefficient of friction such that the apparatus 20 does not readily slip from a palm of a user while the apparatus 20 is being used. It should be noted that the size of the apparatus 20 shown in relation to the mobile phone 22 in FIG. 2 is merely representative and not limiting in terms of relative sizes.

The apparatus 20 includes a display unit 30 mounted within the casing 24. The display unit 30 may be for the display of content to the user. The content may include, for example, a contact list from the mobile phone 22, phone numbers of incoming calls, phone numbers of outgoing calls, still/moving images, incoming/outgoing messages in a form of, for example, SMS-es, MMS-es, video filmlets and so forth. The display unit 30 may be a panel, such as, for example, LCD, OLED, TFT and so forth.

The apparatus 20 also includes a processor 32 coupled with the display unit 30 to control the content displayed in the display unit 30. The processor 32 may also control functions of the apparatus 20. The processor 32 may be coupled to a transceiver 34, the transceiver 34 being for enabling the wireless connection between the apparatus 20 and the mobile phone 22. The transceiver 34 may employ wireless technologies such as, for example, UWB, Bluetooth, infrared, and any form of radio frequency transmission. There may be a memory module 33 for the storage of data and applications coupled to the processor 32.

There may be a positioning module 36 coupled to the processor 32. The positioning module 36 may be for provision of a location of the apparatus 20 to the mobile phone 22. The positioning module 36 may provide the location of the apparatus 20 using either GPS or Wi-Fi positioning. In this regard, the positioning module 36 allows for the location of the apparatus 20 to be provided both indoors (using Wi-Fi positioning by taking reference from Wi-Fi hubs) and outdoors (using either Wi-Fi positioning or GPS).

The apparatus 20 may provide an indication of its location to the mobile phone 22 when the apparatus 20 is at a particular location, with the indication on the mobile phone 22 being either an aural signal or a visual signal. The particular location may be denoted by either a set of GPS coordinates or at least one Wi-Fi hotspot location. The positioning module 36 of the apparatus 20 may use the GPS system when the apparatus 20 is not latched onto a Wi-Fi hotspot. The positioning module 36 may be configured to employ Wi-Fi positioning primarily and only switch to the GPS system if the apparatus 20 is not latched onto a Wi-Fi hotspot.

A set of controls 38 for the user to interface with the apparatus 20 may be coupled to the processor 32 for controlling the apparatus 20. The set of controls 38 may be controllable by the user either via touch or voice. A microphone may be required if voice input is used for the set of controls 38. The set of controls 38 may also enable remote user interaction with a user interface running on the mobile phone 22. In this regard, there may be no necessity to store and run any application on the apparatus 20. An example of an application is a media file management application. The set of controls 38 may enable the apparatus 20 to be used for applications such as, for example, making and receiving telephone calls using a wide area connection of the mobile phone 22, sending and receiving messages in a form of, for example, SMS-es, MMS-es, video filmlets and so forth using the connection of the mobile phone 22, downloading data using the connection of the mobile phone 22, accessing the internet using the connection of the mobile phone 22, playing back media content stored in the mobile phone 22 on the apparatus 20, and so forth. The media content being played back on the apparatus 20 may be using a media player application (together with the media file management application) running on the mobile phone 22. The wide area connection of the mobile phone 22 may be selected from, for example, GPRS, EDGE, 3.5G, HSUPA, HSDPA, GSM, WAP, Wi-Fi, WiMax, LTE and so forth. As such, it should be appreciated that the apparatus 20 may be a device which enables access to applications and content on the mobile phone 22, and the apparatus 20 may have only limited functionality when the wireless connection between the apparatus 20 and the mobile phone 22 is broken. Furthermore, the downloaded data may include maps of a particular location.

The user may use the apparatus 20 during physical exercise and have access to some functionalities of the mobile phone 22 via the secondary apparatus during periods of physical exercise. Alternatively, the user may use the apparatus 20 during occasions when the mobile phone 22 is surrendered for security reasons, and the apparatus 20 allows the user to still have access to some functionalities of the mobile phone 22 during those occasions.

Figure 3:
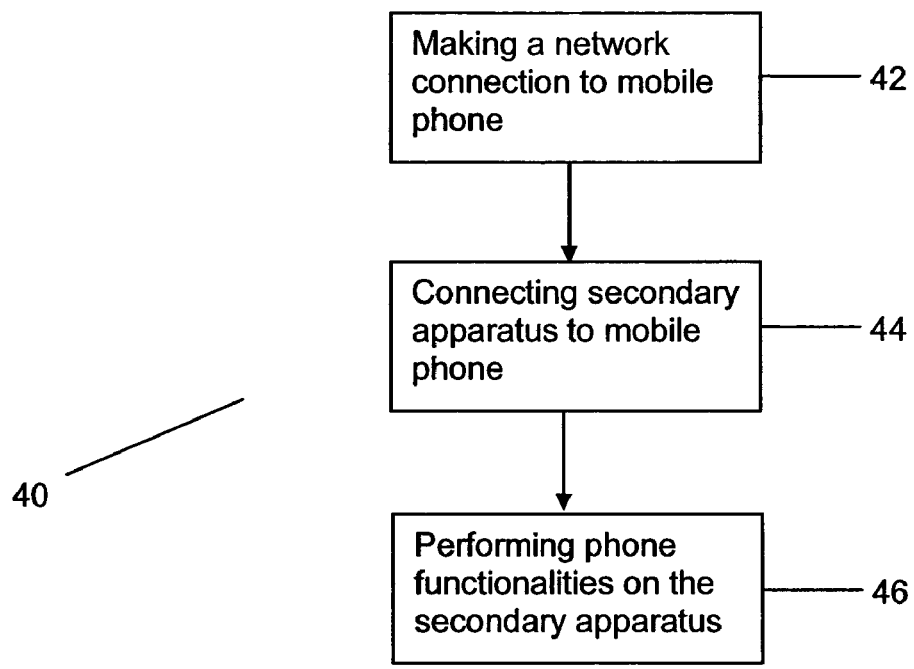
FIG. 3 shows a process flow of a first application of the preferred embodiment of the apparatus.

In a second aspect, with reference to FIG. 3, there is provided a method 40 for accessing the internet, downloading data, making/receiving telephone calls and composing/receiving SMS-es via a wide area connection of the mobile phone when using a secondary apparatus that is wirelessly connectable to a mobile phone. This method 40 may be especially important when the secondary apparatus is not within range of a Wi-Fi hot spot. The method 40 includes making a wide area connection to the mobile phone 42, the wide area connection to the mobile phone being, for example, GPRS, EDGE, 3.5G, HSUPA, HSDPA, GSM, WAP, WiMax, LTE and Wi-Fi. Subsequently, the secondary apparatus may be wirelessly connected to the mobile phone 44, the wireless connection using wireless technologies such as, for example, UWB, Bluetooth, infrared, and any form of radio frequency transmission. Finally, the user may use the secondary apparatus to access the internet, download data, make/receive telephone calls and send/receive messages 46 in a form of, for example, SMS-es, MMS-es, video filmlets and so forth using the wide area connection of the mobile phone. The secondary apparatus may include a set of controls for controlling the secondary apparatus, the set of controls being controllable by the user either via touch or voice. It is advantageous that the set of controls enable user interaction with a user interface and applications running on the mobile phone.

In the second aspect, the user may use the secondary apparatus during physical exercise and have access to some functionalities of the mobile phone via the secondary apparatus during periods of physical exercise. Alternatively, the user may use the secondary apparatus during occasions when the mobile phone is surrendered for security reasons, and the method ensures that the user still has access to some functionalities of the mobile phone via the secondary apparatus during those occasions.

Figure 4:
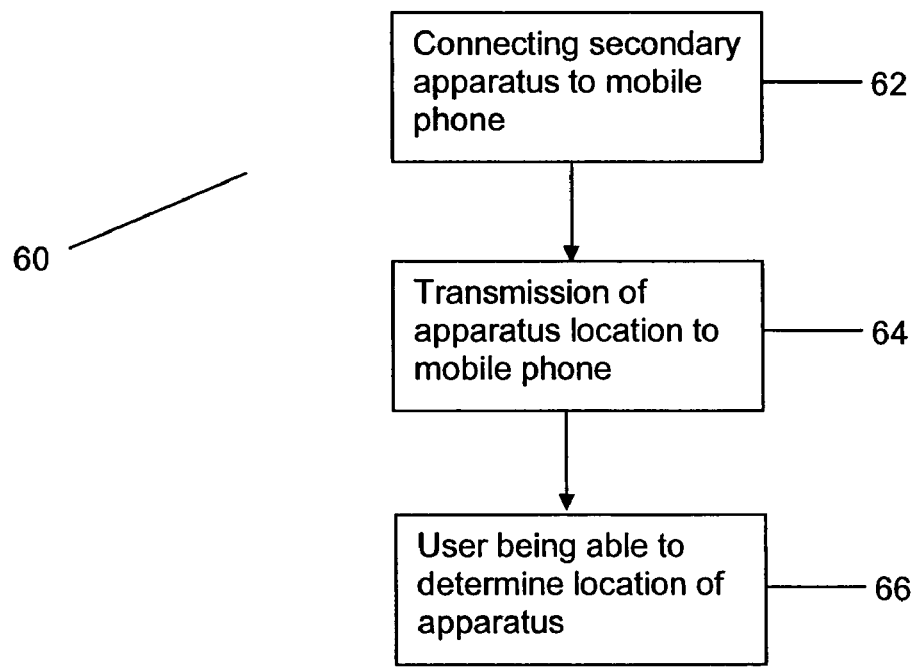
FIG. 4 shows a process flow of a second application of the preferred embodiment of the apparatus.

In a third aspect, with reference to FIG. 4, there is provided a method 60 for providing a location of a secondary apparatus that is wirelessly connectable to a mobile phone to a user of the mobile phone.

The method 60 includes wirelessly connecting the secondary apparatus to the mobile phone 62, where the wireless connection of the secondary apparatus to the mobile phone may use wireless technologies such as, for example, UWB, Bluetooth, infrared, and any form of radio frequency transmission. Subsequently, the location of the secondary apparatus may be transmitted to the mobile phone 64 using information obtained from a positioning module incorporated in the secondary apparatus when the secondary apparatus enters a particular location. The positioning module may provide the location of the secondary apparatus using either GPS or Wi-Fi positioning. The positioning module may use the GPS system when the secondary apparatus is not latched onto a Wi-Fi hotspot. The positioning module may employ Wi-Fi positioning primarily and only switch to GPS if the secondary apparatus is not latched onto a Wi-Fi hotspot. The particular location of the secondary apparatus may be denoted by either a set of GPS coordinates or a set of Wi-Fi hotspot locations. As such, the user of the mobile phone is then able to locate the secondary apparatus 66.

In the third aspect, the user of the mobile phone may use the secondary apparatus as a tracking device. A common instance of such a scenario would be where parents are concerned that their children may get lost at either crowded or expansive places like, for example, shopping malls. The secondary apparatus allows the parents to locate an area which their children are at.

Figure 5:
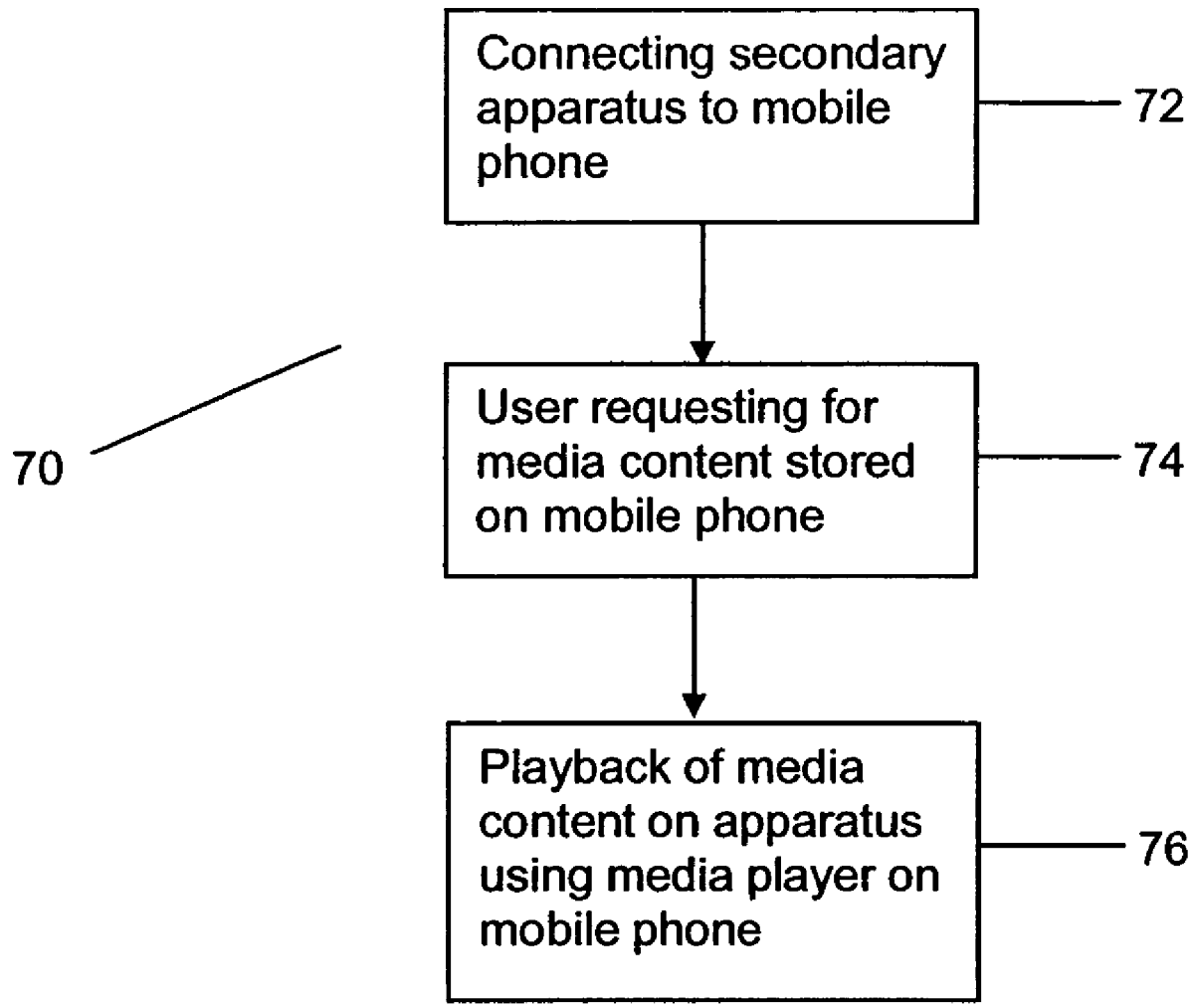
FIG. 5 shows a process flow of a third application of the preferred embodiment of the apparatus.

In a fourth aspect, with reference to FIG. 5, there is provided a method 70 for playing back media content stored on a mobile phone on a secondary apparatus. The method 70 includes wirelessly connecting the secondary apparatus to the mobile phone 72 using wireless technologies such as, for example, UWB, Bluetooth, infrared, any form of radio frequency transmission and the like.

A user of the secondary apparatus may use a set of controls on the secondary apparatus to request for media content stored on the mobile phone to be played back on the secondary apparatus 74. The request may be done through a media file management application. The media file management application may run on either the secondary apparatus or the mobile phone. The set of controls may enable user interaction with a user interface and applications running on the mobile phone. The set of controls may also be controllable by the user using either touch or voice. Subsequently, the media content is played back on the secondary apparatus using a media player application (together with the media file management application) running on the mobile phone 76.

In the fourth aspect, the user may use the secondary apparatus during physical exercise and have access to media content stored in the mobile phone via the secondary apparatus during periods of physical exercise. Alternatively, the user may use the secondary apparatus during occasions when the mobile phone is surrendered for security reasons, and the method ensures that the user still has access to media content stored on the mobile phone via the secondary apparatus during those occasions.

Whilst there has been described in the foregoing description preferred embodiments of the present invention, it will be understood by those skilled in the technology concerned that many variations or modifications in details of design or construction may be made without departing from the present invention.

The invention claimed is:

1. An apparatus that is connectable wirelessly with a mobile phone, the apparatus including:
   a casing for encasing components of the apparatus;
   a display unit mounted within the casing for the display of content to a user;
   a processor coupled with the display unit to control the content displayed in the display unit;
   a transceiver coupled to the processor within the casing to enable the wireless connection between the apparatus and the mobile phone;
   a memory module coupled to the processor, the memory module being for storage of data and applications;
   a positioning module coupled to the processor, the positioning module being for provision of a location of the apparatus to the mobile phone for the mobile phone to track the location of the apparatus; and
   a set of controls coupled to the processor for controlling the apparatus, the set of controls being controllable by the user either via touch or voice;
   wherein the apparatus is used for applications selected from the group consisting of: making and receiving telephone calls using a wide area connection of the mobile phone, composing and receiving messages using the wide area connection of the mobile phone, downloading data using the wide area connection of the mobile phone, accessing the internet using the wide area connection of the mobile phone, and playing back media content; and wherein the apparatus provides an indication of the location to the mobile phone when the apparatus is in a particular location, the indication being selected from the group consisting of: an aural signal, a visual signal and a combination of both of the aforementioned.

2. The apparatus of claim 1, wherein the casing is received in a receptor of the mobile phone.

3. The apparatus of claim 1, wherein the transceiver employs wireless technologies selected from the group consisting of: UWB, Bluetooth, infrared, and any form of radio frequency transmission.

4. The apparatus of claim 1, wherein the positioning module provides the location of the apparatus using either GPS or Wi-Fi positioning.

5. The apparatus of claim 1, wherein the wide area connection of the mobile phone is selected from the group consisting of: GPRS, EDGE, $3.5G_1$ HSUPA, HSDPA, GSM, WAP, WiMax, LTE and Wi-Fi.

6. The apparatus of claim 1, wherein a contact list of the mobile phone is accessible by the user using the apparatus.

7. The apparatus of claim 1, wherein the media content is stored in the mobile phone.

8. The apparatus of claim 1, wherein the set of controls enable user interaction with a user interface and applications running on the mobile phone.

9. The apparatus of claim 1, wherein the media content is played back on the apparatus using a media player application running on the mobile phone.

10. The method of claim 1, wherein the particular location is denoted by either a set of GPS coordinates or a set of Wi-Fi hotspot locations.

11. A method for providing a location of a secondary apparatus that is wirelessly connectable to a mobile phone to a user of the mobile phone, the method including:
wirelessly connecting the secondary apparatus to the mobile phone; and
transmitting the location of the secondary apparatus to the mobile phone using information obtained from a positioning module incorporated in the secondary apparatus when the secondary apparatus enters a particular location,
wherein the positioning module provides the location of the secondary apparatus using either GPS or Wi-Fi positioning for the mobile phone to track the location of the secondary apparatus.

12. The method of claim 11, wherein the wireless connection of the secondary apparatus to the mobile phone uses wireless technologies selected from the group consisting of: UWB, Bluetooth, infrared, and any form of radio frequency transmission.

13. The method of claim 11, wherein the particular location is denoted by either a set of GPS coordinates or a set of Wi-Fi hotspot locations.

14. A method for playing back media content stored on a mobile phone on a secondary apparatus, the location of the secondary apparatus being tracked by the mobile phone, the method including:
wirelessly connecting the secondary apparatus to the mobile phone;
a user of the secondary apparatus using a set of controls on the secondary apparatus requesting for media content stored on the mobile phone to be played back on the secondary apparatus;
providing the location of the secondary apparatus to the mobile phone for the mobile phone to track the location of the secondary apparatus; and
playing back the media content on the secondary apparatus using a media player running on the mobile phone.

15. The method of claim 14, wherein the wireless connection of the secondary apparatus to the mobile phone uses wireless technologies selected from the group consisting of: UWB, Bluetooth, infrared, and any form of radio frequency transmission.

16. The method of claim 14, wherein the set of controls enable user interaction with a user interface and applications running on the mobile phone.

17. The method of claim 14, wherein the set of controls is controllable by the user either via touch or voice.

* * * * *